United States Patent [19]

Talley

[11] 3,911,599
[45] Oct. 14, 1975

[54] GUNNER ACCURACY CONTROL PANEL

[75] Inventor: Douglas G. Talley, Los Angeles, Calif.

[73] Assignee: Hughes Aircraft Company, Culver City, Calif.

[22] Filed: Sept. 30, 1974

[21] Appl. No.: 511,555

[52] U.S. Cl. ................................................. 35/25
[51] Int. Cl.² ........................................ F41G 3/26
[58] Field of Search .......... 35/25; 346/38; 89/41 EA

[56] References Cited
UNITED STATES PATENTS

| | | | |
|---|---|---|---|
| 3,257,741 | 6/1966 | Cameron et al. ........................ | 35/25 |
| 3,798,795 | 3/1974 | Michelsen ............................... | 35/25 |

Primary Examiner—John H. Wolff
Attorney, Agent, or Firm—Paul H. Ware; W. H. MacAllister

[57] ABSTRACT

A system for quantitatively and qualitatively evaluating the tracking performance of personnel using a telescopic sight to track a target is provided. The readout presented by the Gunner Accuracy Control Panel (GACP) is digital and hence may be reliably stored for an indefinite period of time with negligible drift. The liquid crystal display is visible in direct sunlight and may be artificially lighted for night use. When a target is tracked with the system of the invention, azimuth and elevation error signals are generated indicating the displacement of the tracked target from the optical line-of-sight of the tracker. The GACP processes these signals and presents a score as displayed on a digital readout which is inversely proportional to the total standard deviation from the line-of-sight of the operator's tracking. No resetting is required, the digital readout turns off when the scoring begins and comes on a preselected time later to present the score achieved during that time.

10 Claims, 5 Drawing Figures

GUNNER ACCURACY CONTROL PANEL

BACKGROUND OF THE INVENTION

1. Field of the Invention

This invention relates generally to devices used to evaluate the performance of a gunner in tracking a real or simulated target.

2. Description of the Prior Art

Some earlier devices have utilized gyroscopes for the generation of feedback signals that were proportional to the angular velocity experienced by a weapon mount. In such a system, a first gyro output signal would represent an azimuth velocity signal and a second gyro would represent an elevation velocity signal. Signals derived in this manner have been compared to those developed in pre-programmed, simulated target paths and the error signals thus derived used to measure the operator's ability to track such simulated target path. When the feedback signals from the weapon mount differed from the pre-programmed signals, an error signal would result.

Another device incorporates servo motors for moving the sighting mechanism and for moving the weapon platform. In most systems, the readout devices for displaying a measure of how well the operator could track a target have been electric meters capable of measuring the error signals generated. In one instance, a pair of mirror galvanometers arranged to deflect a collimated light beam into the view finder of a tracking camera caused the reflected light beam to move vertically and/or horizontally in accordance with the magnitude and polarity of an error signal. If the weapon mount is manipulated so as to follow the pre-programmed flight pattern, the light beam remains at the center of the view finder. If, however, the simulated target image moves away from the center of the tracking reticle, the weapon mount must be manipulated by the operator so as to bring reticle and simulated target again into conjunction. In effect, the action of the operator should tend to cancel the pre-programmed signal.

Such prior art devices have been bulky, heavy and have suffered from drift. The readout mechanisms have been either unreliable or very delicate or both and have been dependent on ambient lighting conditions for efficiency of display to an observer.

Power drain is high on these prior art devices and that fact alone has contributed significantly to the greater bulkiness and weight as compared to the present invention. Power supply fluctuations and long term drift have made prior art devices unreliable and difficult of operation.

It would be of great benefit to the art to develop a system to evaluate the ability of a weapons operator that required little power, was not bulky or heavy, that did not drift and that included a reliable readout that did not drift and that could be easily stored for future reference and was not dependent on ambient lighting conditions for efficiency of display to an observer.

SUMMARY OF THE INVENTION

A Gunner Accuracy control Panel according to the invention, includes a digital display panel that indicates the numerical value of a score attained by operating personnel using a telescopic sight to track a target. The score thus attained is a measure of the operator's proficiency in following the path described by a real or simulated target. When an operator - gunner tracks a target with the system, a tracker generates DC error signals in azimuth and elevation which indicate the displacement of the target from the optical line-of-sight of the tracker. The Gunner Accuracy Control Panele (GACP) processes these signals through a unique analog digital integration circuit which displays a score on a digital readout which is inversely proportional to the total standard deviation from the line-of-sight of the operator - gunner's tracking.

It is therefore an object of the present invention to provide a system capable of selecting and training airborne gunners without necessitating the firing of missiles.

Another object of the invention is to provide such a gunner training system whereby the operator is required to perform few if any resetting functions.

A further object of the invention is to provide a large, easy to read digital readout thereby eliminating reading errors.

A still further object of the invention is to provide a capability of permanently storing attained scores in a digital memory thus eliminating drift errors.

An additional object of the present invention is to provide a system for the selection and training of airborne gunners that can be cockpit mounted in a minimum of space.

Yet another object of the present invention is to provide a system exhibiting all the advantages of the aforestated objects and whose power consumption is low.

Additional objects, advantages and characteristic features of the present invention will become readily apparent from the following detailed description of preferred embodiments of the invention when considered in conjunction with the accompanying drawings.

DESCRIPTION OF THE PREFERRED EMBODIMENT

Figure 1:
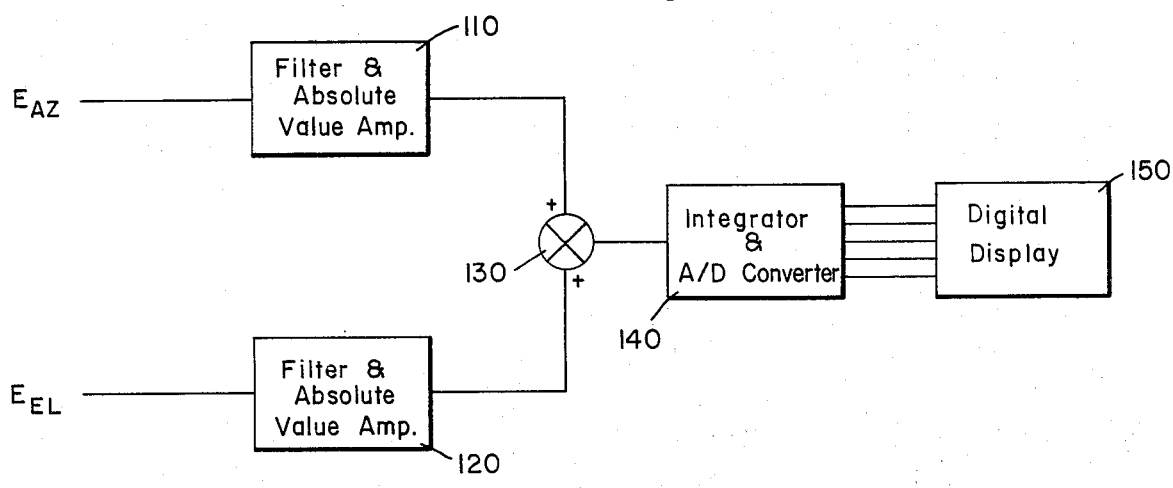
FIG. 1 is a highly simplified, block diagram of the invention.

Referring to FIG. 1 with greater particularity a Gunner's Accuracy Control Panel in accordance with the invention computes score by processing the azimuth and elevation error signals from a telescopic sight unit (TSU). And solving the equation:

$$\text{Score} = 99 - 14.5 \left\{ 12.4 \left[ \int_o^T \left| \int_o^t e^{-31.25(t-\tau)} V_{S1_{Az}}(\tau) d\tau \right| dt \right. \right.$$
$$\left. \left. + \int_o^T \left| \int_o^t e^{-31.25(t-\tau)} V_{S1_{El}}(\tau) d\tau \right| dt \right] - 1 \right\}$$

where:

$V_{S1_{Az}}$ = Azimuth IR error from ED(volts)

$V_{S1_{El}}$ = Elevation IR error from ED (volts)

$t$ = time $T$ = predetermined scoring period eg. 12 seconds $\tau$ = dummy variable The error signals thus received are filtered and amplified and then made positive by filter and absolute-value amplifiers 110 and 120. These absolute values of the error signals for azimuth and elevation are summed in summer 130 and then fed to an integrator - analog-to-digital converter unit 140 where it is processed for display by digital display unit 150.

Figure 2:
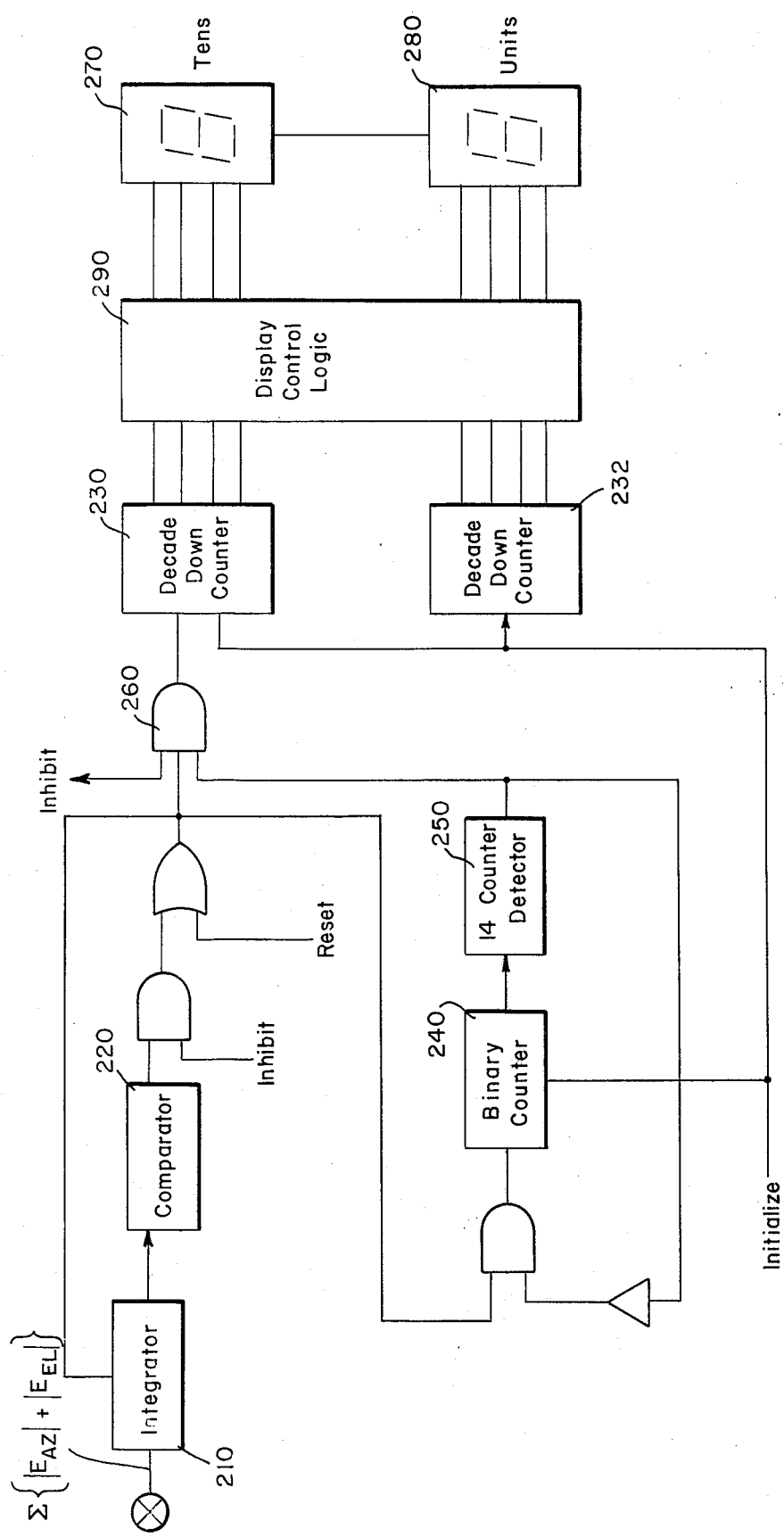
FIG. 2 is a more complete but still simplified operational block diagram of the invention.

Referring now to FIG. 2, the sum of the analog errors is fed to an analog integrator 210 which is reset to zero by a comparator 220 after a predetermined integrator output is reached. Simultaneously with the integrator reset, a pulse E is generated which drives a digital decade counter 230.

The pulses from this analog-to-frequency converter 200 are fed to a digital decade counter 230 for determination of the score. The first 14 pulses are counted by the binary counter 240 by the 14 count detector 250 and only the 15th and later pulses are allowed to clock the counter 230 via AND gate 260.

The counter 230 counts down from 99 upon receipt of the 15th and subsequent pulses, is inhibited after T seconds, and the contents of the counters 230 and 232 made available to the indicators 270 and 280 for displaying score via display control logic 290.

Figure 3:
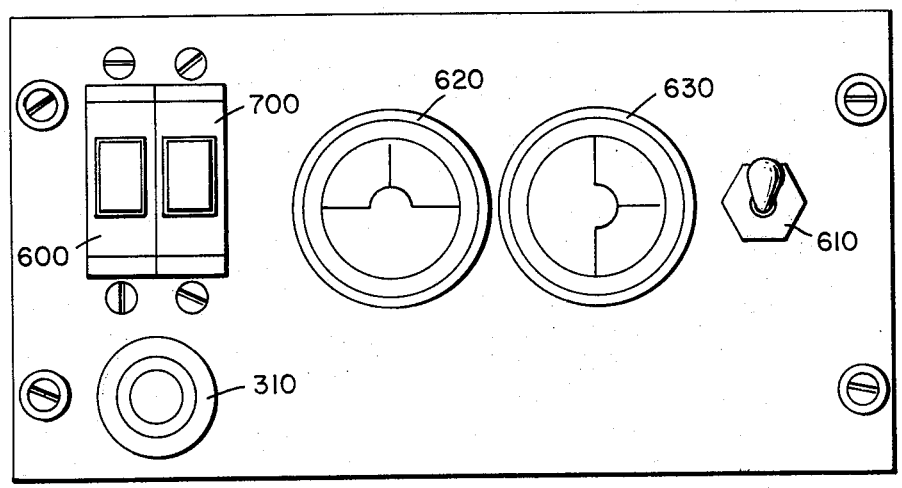
FIG. 3 is a front elevational view of the panel.

Referring now to FIG. 3, a representative layout of the Gunner Accuracy Control Panel is shown. The dimensions of the front of the panel in a prototype embodiment were about 3 by 6 inches. Momentary start switch 310 is shown directly beneath liquid crystal display units 600 and 700. Off-On power switch is shown at the extreme right adjacent azimuth and elevation indicators 620 and 630.

Figure 4A:
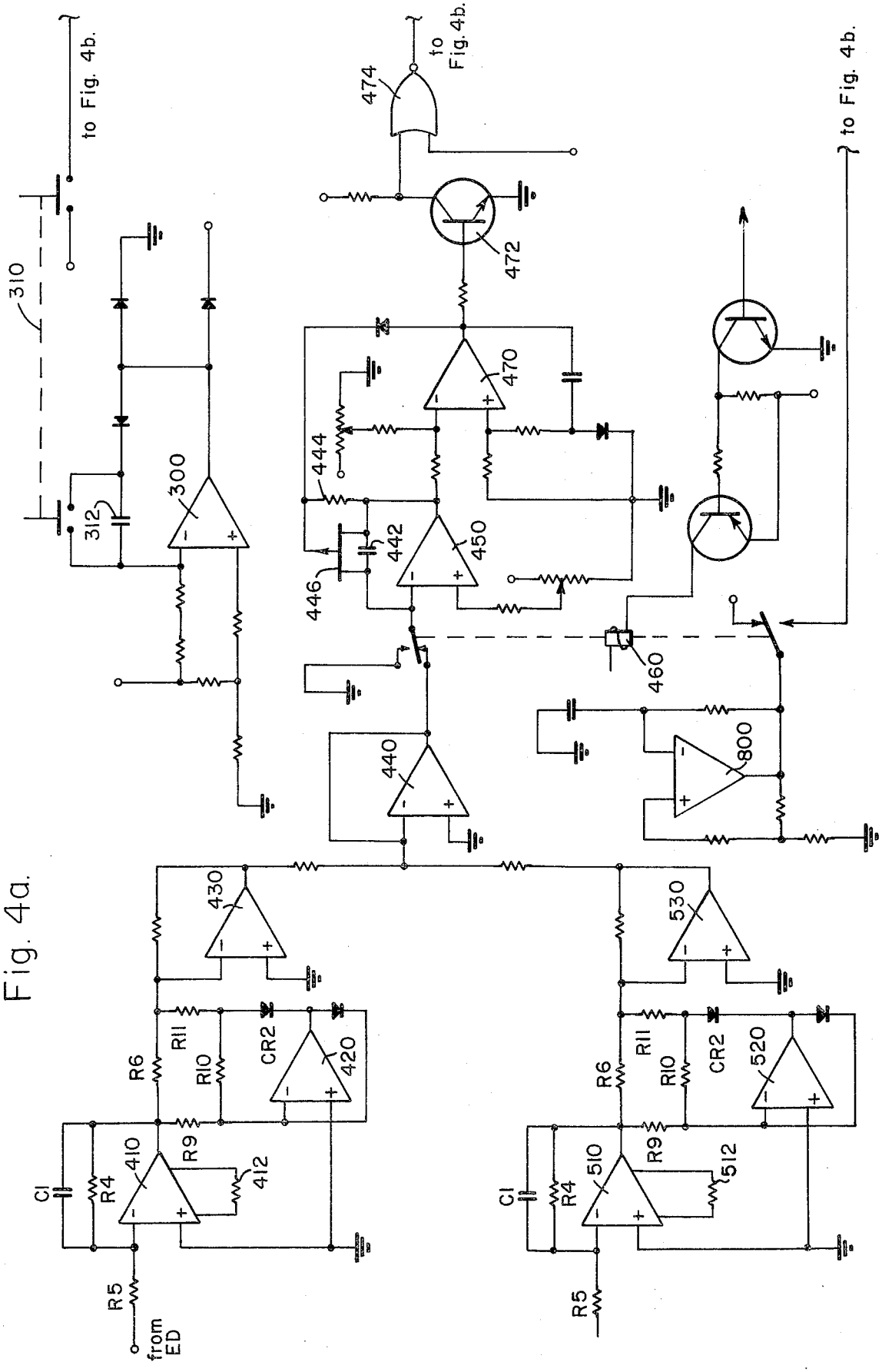
FIG. 4($a$, $b$) is an operational schematic diagram of the invention.
Figure 4B:
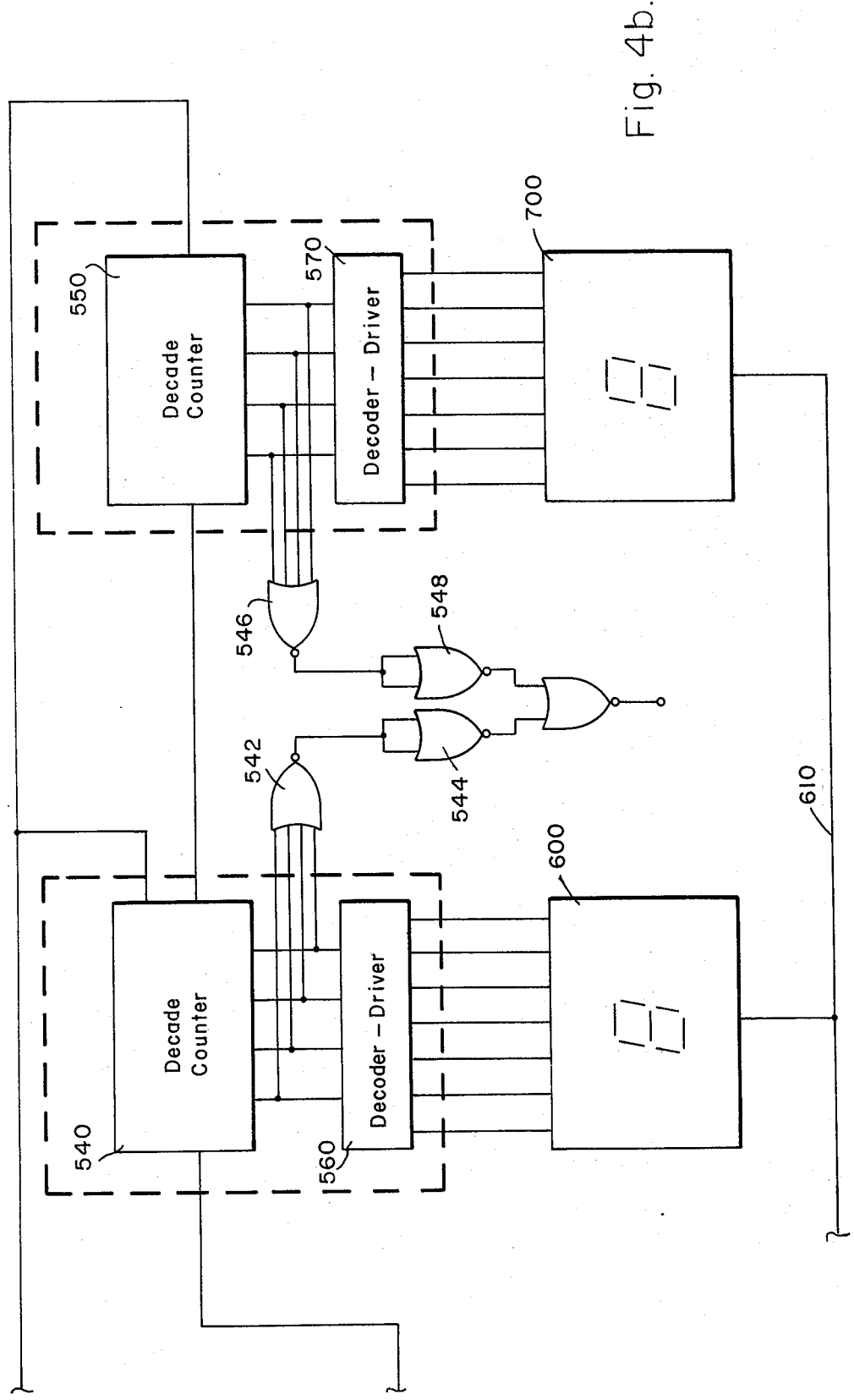

Referring now to FIG. 4(a, b), the operation of the GACP may be explained in greater detail.

Amplifiers 410, 420, 430, 510, 520 and 530 produce the positive absolute values of the azimuth and elevation error signals $V_{s1}$. These signals are summed in summing amplifier 440 whose output is a negative voltage. When relay 460 is de-energized, the output from summing amplifier 440 is applied to the integrator comprising capacitor 442 and resistor 444. When the integrator charges up to approximately +7 volts the FET 446 across its charging capacitor 442 is turned on for 1 millisecond by the comparator-one-shot configuration of amplifiers 450 and 470. The capacitor 442 completely discharges and then resumes charging.

The integration time is controlled by amplifier 300 which has a high output in its quiescent state. When momentary start switch 310 is depressed by the pilot (or trigger switch by the gunner), capacitor 312 is discharged and the output of amplifier 300 goes low causing relay 460 to change state. At the same time counters 540 and 550 are set at 99. When switch 310 is released, the counters 540 and 550 are enabled and capacitor 312 begins to charge. At the end of T seconds (e.g., in this preferred embodiment, T=12 seconds) the output of amplifier 300 changes state and relay 460 returns to quiescent condition. Thus, whenever the start button 310 is depressed, the display lights in liquid crystal display units 600 and 700 go out for T seconds and return to an ON condition with the latest score displayed.

The 1-millisecond output of the comparator amplifiers 450 and 470, is applied to the clock input of a decade counter 540 through transistor 472 and logic circuit 474. The decade counter 540 which is programmed to count down from 9, is triggered every time the comparator fires. When the counter reaches zero it automatically resets itself on the next clock pulse and outputs a pulse to the next decade counter 550 which is also programmed to count down from 9. If the count should reach 00 the gates in logic circuits 542, 544, 546 and 548 inhibit the clock pulses from reaching the decade counters. The four Bit BCD outputs of the decade counters 540 and 550 are decoded in Decoder-drivers 560 and 570 and drive the appropriate segments of the liquid crystal displays 600 and 700.

Liquid crystal devices have a constant contrast ratio under all ambient lighting conditions. Hence the brighter the ambient light the brighter the display. The liquid crystal display's low power comsumption is about 35 ua at +15 volts Ac. Viewing experiments were conducted in bright sunlight using Light Emitting Diodes (LEDs) and incandescent displays which indicated that at least 500 milliamps at +15 V DC would be required to provide sufficient brightness with LED or incandescent indicators. Thus the liquid crystal displays provide the lowest power consumption and eliminate the need for a brightness control.

The embodiment of the invention here disclosed uses two liquid crystal display units 600 and 700. The display units are driven by decade counters 540 and 550 through BCD decoder - drivers 560 and 570. Liquid crystal display devices representative of those used in a prototype design are manufactured by the Bowmar Company of Ft. Wayne, Ind. under the trade name LOGICATOR and have a part number DA-3308. These units include the driver and BCD conversion in one package. When the momentary start switch 310 is depressed thus causing relay 460 to change state, the common return line 610, to display units 600 and 700, is connected to the output of amplifier 800. As previously noted, the display lights, in the liquid crystal display units 600 and 700 go out for T seconds during which time the tracking accuracy score is being determined. At the end of the T seconds, the liquid crystal display units display the attained score.

Still referring to FIG. 4, some of the elements of the invention may now be considered in greater detail. The azimuth and elevation analog channels consist of active filter-amplifiers 410 and 510 and absolute value amplifiers 420, 430, 520 and 530. The active filter-amplifiers 410 and 510 receive inputs from the telescopic sight unit (TSU) error detector (ED). When properly "zeroed", the inputs from the zero circuits 412 and 512 are summed with the inputs from the ED so as to offset any misalignment error voltage from the ED. The filter amplifier has a transfer function of $$\frac{e_t}{V_{S1}} = \frac{-K_1}{T_1 S + 1}$$

where
$$T_1 = R_4 C_1 \text{ and}$$

$$K_1 = DC \text{ gain } \frac{R_4}{R_5}$$

The amplifier has a balanced input to minimize the effects of drift and common mode voltages.

The absolute value amplifiers 420, 430, 520 and 530 or full-wave rectifiers convert both positive and negative voltages to positive since both positive and negative ED voltages constitute errors of equal importance. Negative inputs to 420 and 530 cause their outputs to drive positive, which reverse biases CR2 and effectively disconnects 420 and 520 outputs from 430 and 530 inputs respectively. 430 and 530 then act as unity gain inverting amplifiers. Positive inputs to 420 and 520 cause their outputs to drive negative and clamp the junction of R10 and R11 to a voltage equal and opposite to the input at the junction of R6 and R9. Because of the resistor ratios of R6 and R11, 430 and 530 now act as unity gain non-inverting amplifiers to the inputs.

The analog-to-frequency converter consists of an integrator-comparator 540, 442, 444, 446 and 470 and a reset function 300, 310, 312 and relay 460. The integrator sums the absolute values of error from the azimuth and elevation channels and integrates from 0 volts down to approximately −9 volts, at which time capacitor 442 is discharged and the process is repeated. Integrator gain is:

$$\frac{e_{in}}{e_{out}} = \frac{K_1}{S}$$

The comparator in this preferred embodiment is referenced to a stable voltage source. Normally the comparator output is negative, but when the integrator output exceeds the reference voltage, the polarity of the comparator output changes to positive until the integrator is reset.

The reset function performed by FET 446 is initiated by a positive voltage at the comparator output. At this time FET 446 is turned on and capacitor 442 is thereby discharged. When capacitor 442 is discharged the comparator resets, FET 446 is turned off, and the integration begins anew. This process forms a pulse which represents a quantum in integrated error which is used to determine the score.

There has thus been described a Gunner Accuracy Control Panel, useful in selecting and training airborne gunners. The device features a reliable readout indicator that is highly visible in direct sunlight and under all conditions of ambient lighting. The numerical values recorded as scores attained during a tracking run are easily storable and have no drift disadvantages. The low power drain inherent in the design of the device results in a package of such size and weight as to be easily cockpit mounted and airborne.

What is claimed is:

1. A Gunner's Accuracy Control Panel comprising:
   means for receiving and processing an azimuth tracking error signal;
   means for receiving and processing an elevation tracking error signal;
   means for rectifying said azimuth tracking error signal causing all its deviations from a reference to be of like polarity;
   means for rectifying said elevation tracking error signal causing all its deviations from a reference to be of like polarity;
   means forming the sum of the absolute values of said azimuth and elevation tracking error signals;
   means for pre selecting a time interval during which said azimuth and elevation tracking errors signals are accumulated;
   means for scoring said sum of the absolute values of said azimuth and elevation tracking error signals during said pre selected time interval; and
   means for displaying a tracking score attained during said pre selected time interval.

2. A Gunner's Accuracy Control Panel according to claim 1 wherein said means for rectifying said azimuth tracking error signal includes at least one absolute value amplifier.

3. The system of claim 2 wherein said means for rectifying said elevation tracking error signal includes at least one absolute value amplifier.

4. A Gunner's Accuracy Control Panel according to claim 1 wherein said means for scoring said sum of the absolute values of said azimuth and elevation tracking error signals during said pre selected time interval includes an analog integrator.

5. The system of claim 4 wherein said analog integrator includes a field effect transistor as one control element.

6. The system of claim 5 comprising at least one decade counter, triggered by a one-shot comparator configuration.

7. A Gunner's Accuracy Control Panel according to claim 1 wherein said means for displaying a tracking score comprises at least one digital numerical display indicator.

8. The system of claim 7 wherein said digital numerical display indicator is a liquid crystal cell.

9. A Gunner's Accuracy Control Panel comprising:
   a first filter amplifier for receiving and processing an azimuth tracking error signal;
   a second filter amplifier for receiving and processing an elevation tracking error signal;
   a first absolute value amplifier for further processing said azimuth tracking error signal by rectification causing all of its deviations from a reference to be of like polarity;
   a second absolute value amplifier for further processing said elevation tracking error signal by rectification causing all its deviations from a reference to be of like polarity;
   a summing amplifier forming the sum of the absolute values of said azimuth and elevation tracking error signals;
   a timer pre selecting a timed interval during which said azimuth and elevation tracking error signals are accumulated;
   a counter in which said sum of the absolute values of said azimuth and elevation tracking error signals will be stored for said pre selected timed interval; and
   a display indicating a tracking score attained during said pre selected timed interval.

10. The system of claim 9 wherein said display indicating a tracking score is a digital, liquid crystal, numerical indicator.

* * * * *